US005537731A

United States Patent [19]

Sassi

[11] Patent Number: 5,537,731
[45] Date of Patent: Jul. 23, 1996

[54] METHOD FOR AUTOMATIC FORMING OF PACKS OF TRIMMED METAL SHEETS FOR THE MANUFACTURE OF ARMATURES OF ELECTRICAL MACHINERY OR THE LIKE

[75] Inventor: Ezio M. Sassi, Varazze, Italy

[73] Assignee: SASSI S.r.L., Varazze, Italy

[21] Appl. No.: 248,451

[22] Filed: May 24, 1994

[30]     Foreign Application Priority Data

May 26, 1993 [IT] Italy ................................. GE93A0046

[51] Int. Cl.$^6$ ............................................. H02K 15/02
[52] U.S. Cl. .................. 29/598; 29/609; 29/732; 29/738; 414/796.1; 414/724; 414/907; 414/900
[58] Field of Search ............................ 29/596, 598, 609, 29/732, 738; 414/924, 925, 926, 900, 907, 796, 796.1

[56]          References Cited

U.S. PATENT DOCUMENTS 4,760,638  8/1988  Ott et al. ..................................... 29/732
4,899,433  2/1990  Morschel et al. .......................... 29/596

FOREIGN PATENT DOCUMENTS 142111  4/1980  Germany .

OTHER PUBLICATIONS

Soviet Inventions Illustrated, S–X Electrical Section, Week 9313, 1992.

*Primary Examiner*—Carl E. Hall
*Attorney, Agent, or Firm*—Larson and Taylor

[57]          ABSTRACT

In a method for the automatic forming of packs of trimmed metal sheets for armatures of electrical machinery or the like, the pack (P') is formed by the controlled drop of a sheet stack (P) housed in a tubular magazine (1) open at the bottom. The pack is dropped against an underlying collection bottom (2) which is brought to a predefined distance from the lower end of the magazine (1). A tightening clamp (3,4) at the lower end of the magazine (1) blocks the stack (P) against a further gravity drop after its descent against the collection bottom (2). A subsequent first lowering of the bottom (2) to separate the pack (P') from the overlying stack, by virtue of a detachment device (22, 122), is followed by a detachment from the lower sheet (L') of the stack (P) of a possible sheet (L) which is mistakenly and temporarily held against the lower sheet (L') of the stack (P) but belongs to the overlying pack (P').

5 Claims, 9 Drawing Sheets

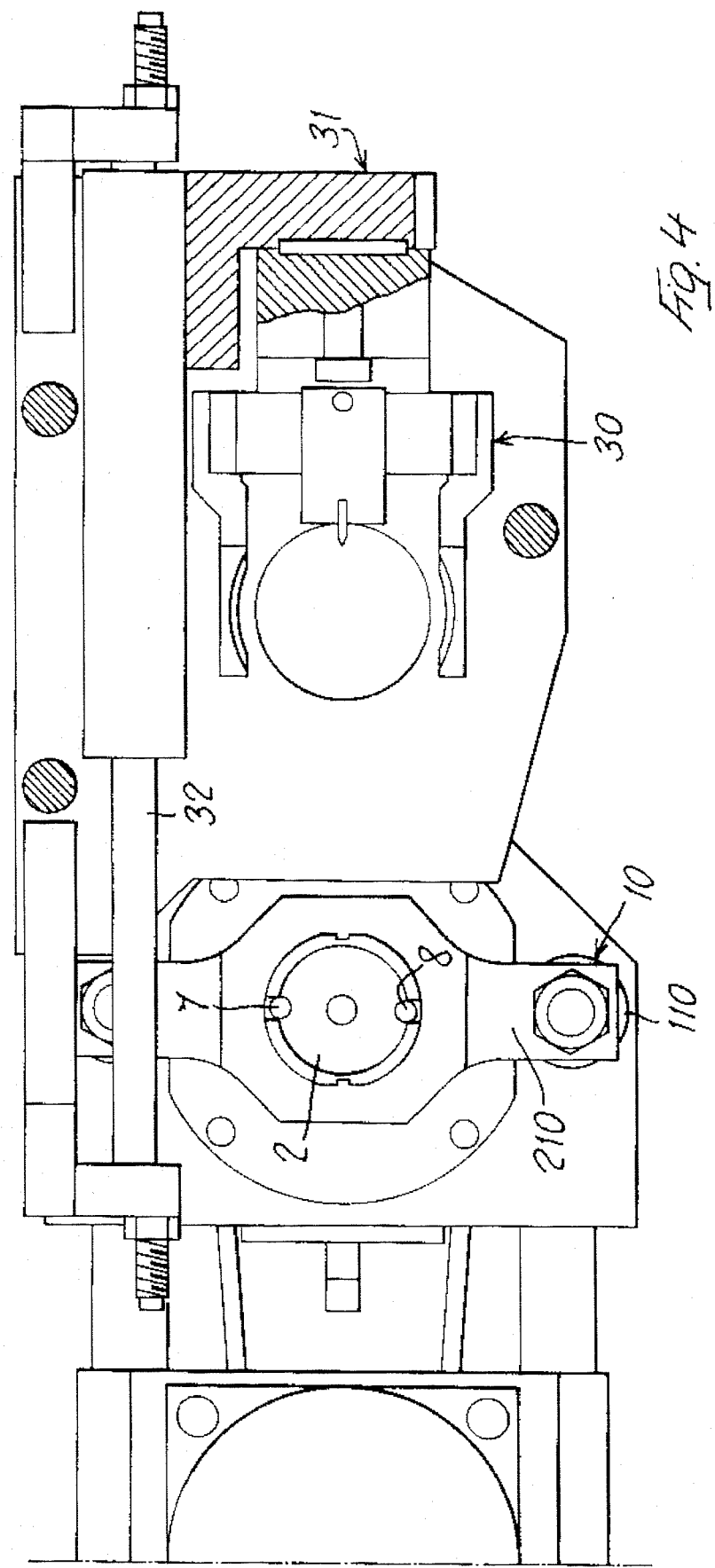

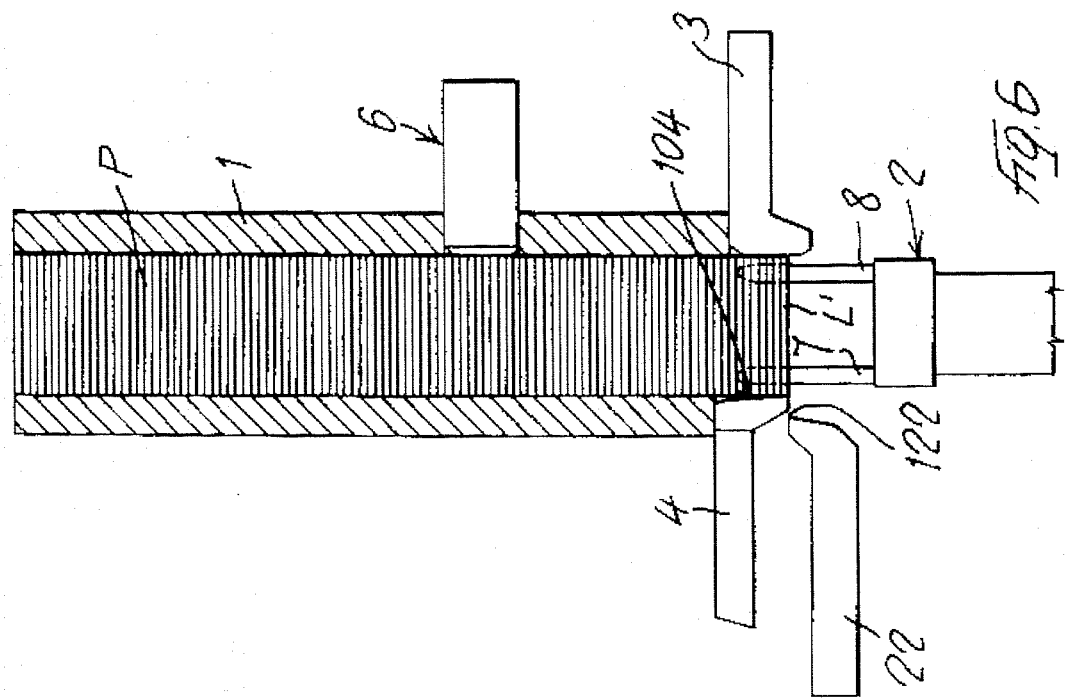
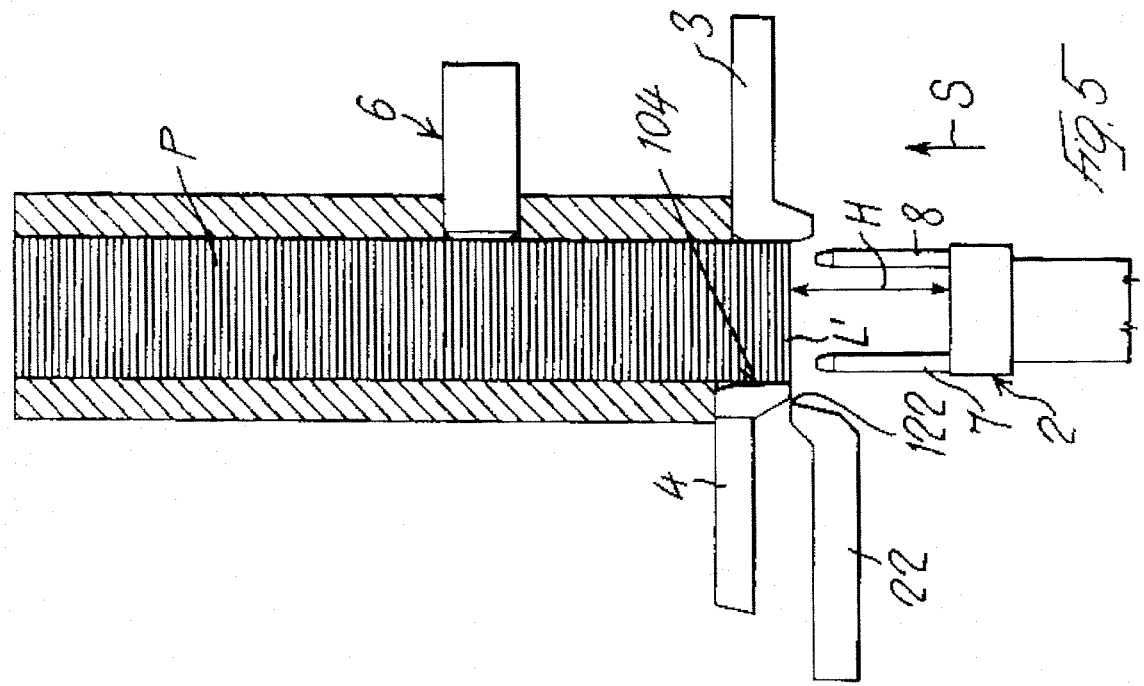

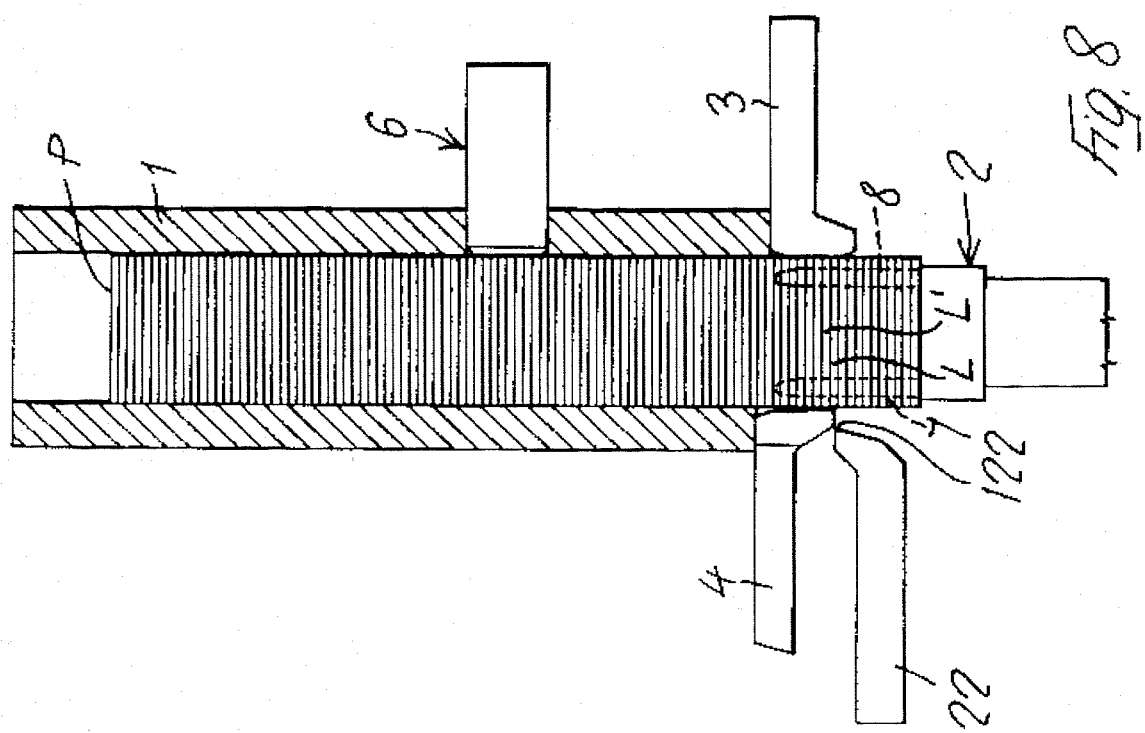
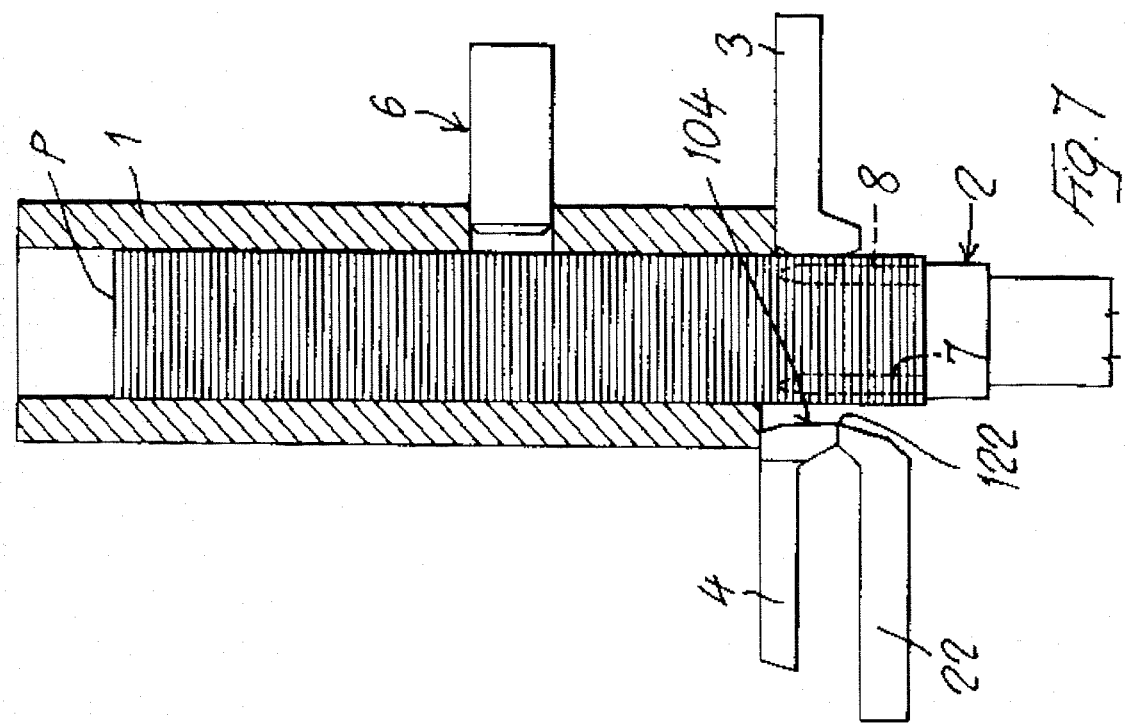

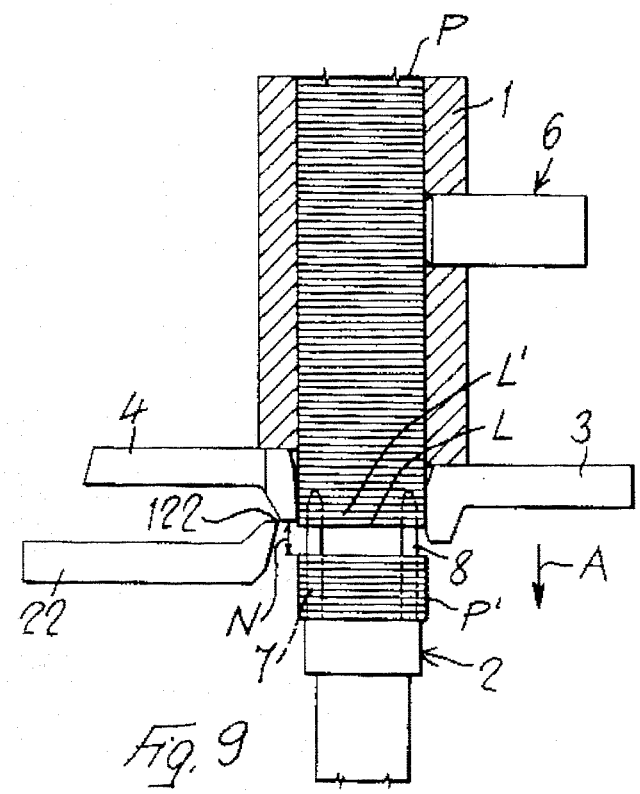
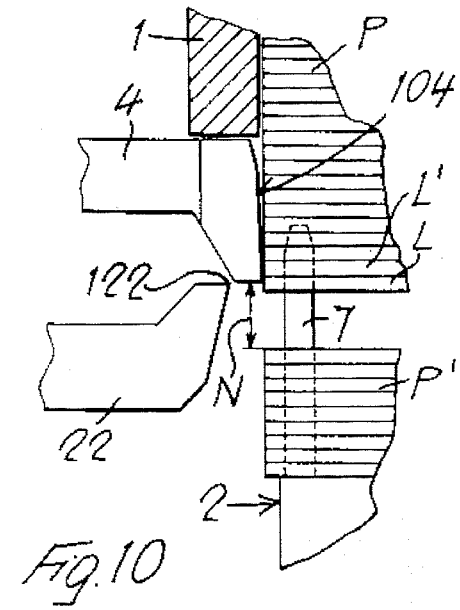
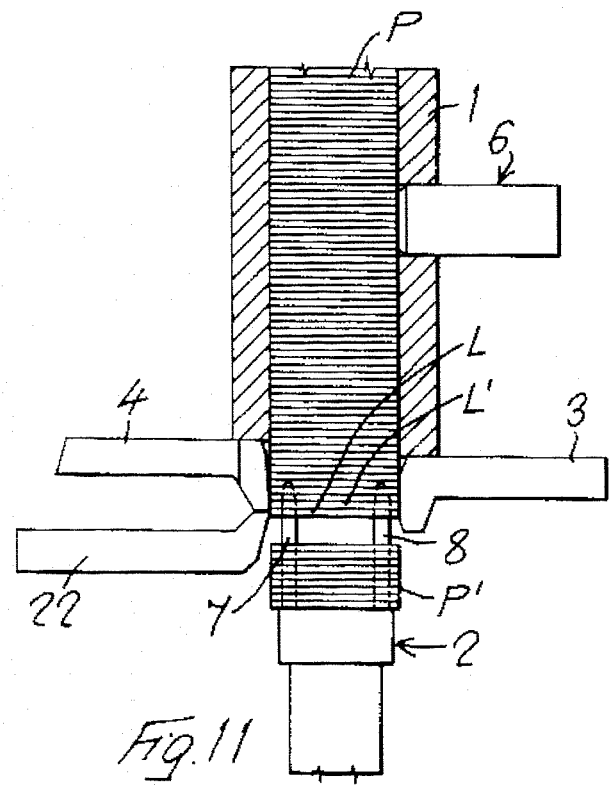
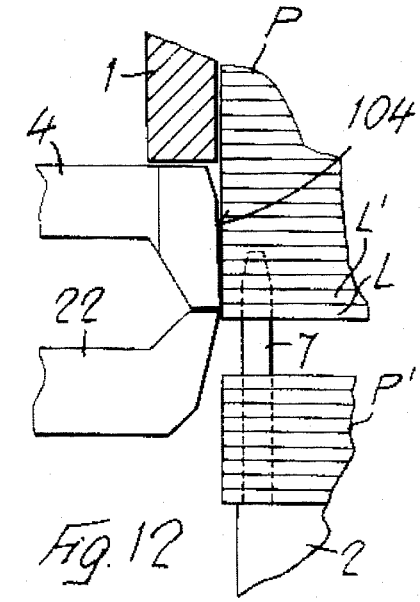

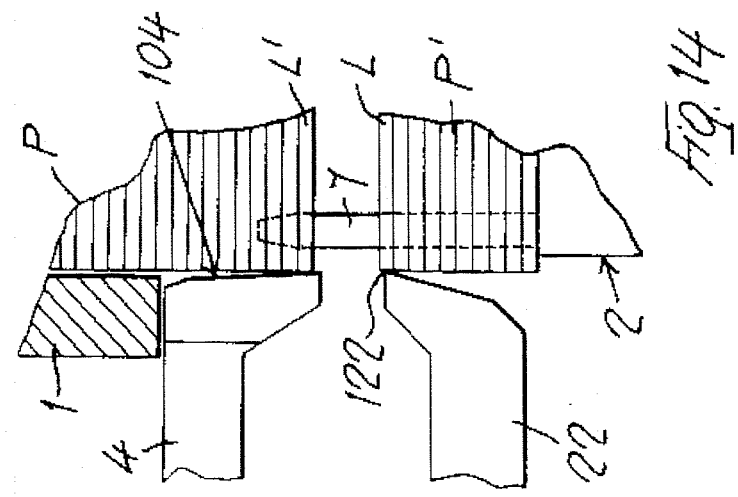
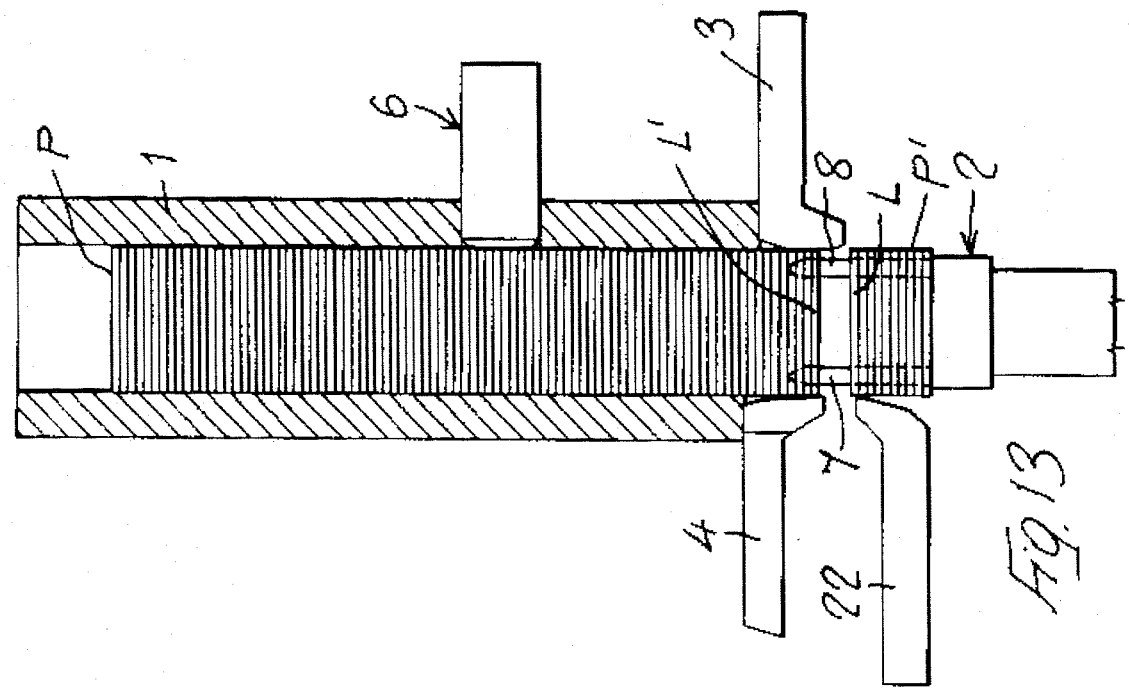

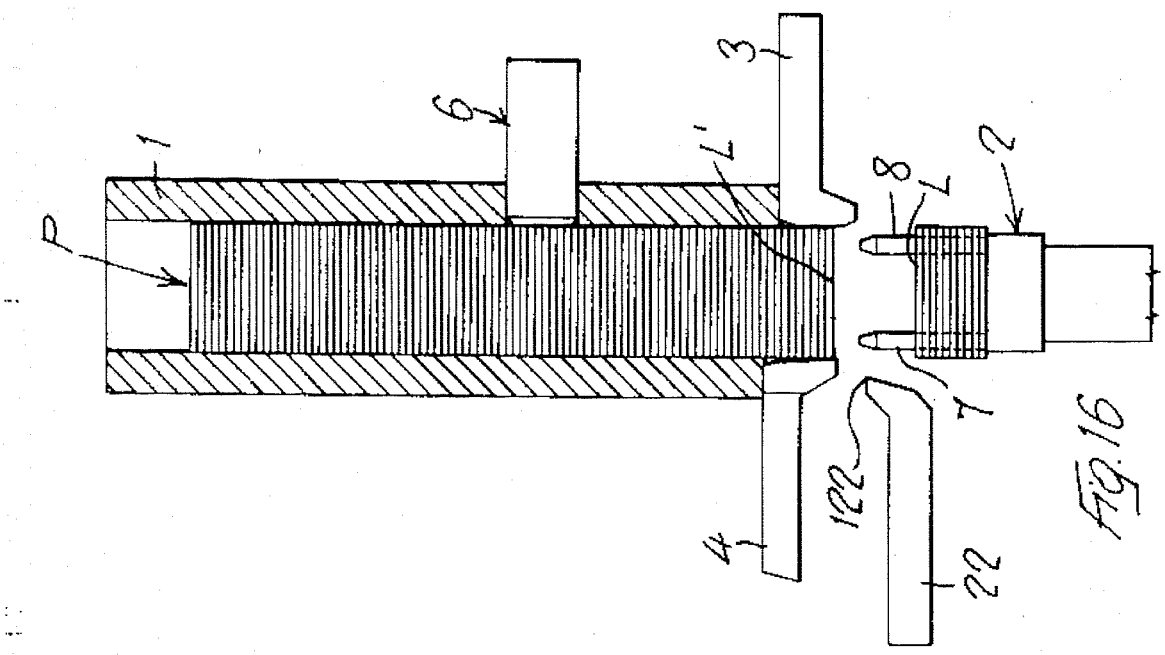
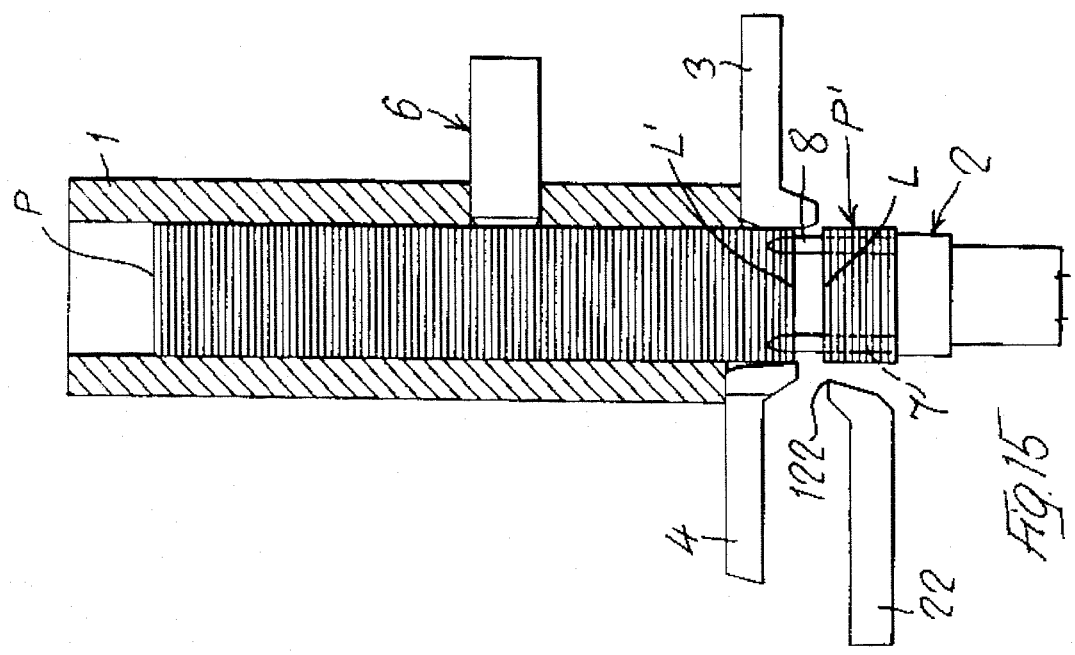

METHOD FOR AUTOMATIC FORMING OF PACKS OF TRIMMED METAL SHEETS FOR THE MANUFACTURE OF ARMATURES OF ELECTRICAL MACHINERY OR THE LIKE

FIELD OF THE INVENTION

The purpose of the invention is to provide a method and device for automatic forming of packs of trimmed metal sheets for the manufacture of armatures of electrical machinery or the like. The purpose is achieved through automatic precision proportioning of the sheet pack consisting of the collection and through separation of a predefined number of sheets, corresponding to a predefined height of the pack itself, from a sheet stack. There is also provided a vertical magazine for a sheet stack which is open at the bottom and the lower end, which magazine is associated with a raisable and lowerable bottom for the collection of the sheet pack.

BACKGROUND OF THE INVENTION

This technique is used for the manufacture of metal armatures, for instance, stators and rotors for electric motors, transformers, remote control switches, etc.

The proportioning of the sheet pack to be separated from the sheet stack is made difficult by the fact that, for a predefined height of the sheet pack, no one knows the number of sheets comprising it and thus no one can determine the division line between the last upper sheet of the pack and the next lower sheet of the stack which constitutes the first lower sheet of the subsequent pack. This is due to the tolerances in the thickness of the plate from which individual sheets are trimmed. Owing to the tolerances of these plates, when the pack is separated from the overlying stack of sheets, the last upper sheet still belonging to the separated pack can still be held temporarily at the lower end of the overlying stack of sheets by means intended to block it in the magazine. For instance, the last upper sheet may be engaged by said means only for a small portion of its thickness. Therefore, in these conditions, the separated sheet pack is missing a sheet and is thus undersized. Furthermore, the last sheet belonging to the separated pack and precariously held against the overlying stack can detach itself from the stack at any time and, falling in an uncontrolled manner, can damage and jam the device.

The last sheet of the separated pack can also be precariously held against the stack itself, because of a moderate sticking or adhesion effect due, for instance, to the presence of trimming lubricants, oxides, material annealing, or other similar causes.

SUMMARY OF THE INVENTION

Therefore, the purpose of the invention is to enhance a method and device for forming packs of sheets of the type described above. Thus by relatively simple and non-costly means, the invention makes it possible effectively to avoid the above disadvantage so as to attain maximum operating speed and maximum pack proportioning precision, and thus to avoid interruptions in the productive cycle and possible damages to the device.

The invention solves this problem with a method such as the one described above which includes the following phases or steps for forming the sheet pack:

Shifting the collection bottom in a raised position at a predefined distance from the lower sheet of the vertical sheet stack, which sheet stack is held against a gravity fall towards the collection bottom by a clamp acting together with the peripheral edges of one or more lower sheets of said stack; this distance corresponds to a predefined height of the sheet pack to be collected or to a certain number of sheets of the stack;

Opening the clamp and gravity sliding the sheet stack towards the collection bottom of the sheet stack, to an extent corresponding to the predefined height of the sheet pack;

Separation of the sheet pack from the overlying sheet stack through re-closure of the clamp and a first lowering of the collection bottom through detachment of the sheet pack from the overlying stack;

Detachment of any last sheet of the separated pack which erroneously remained held by part of its thickness by the clamp and remained moderately stuck to the lower sheet of the sheet stack intended to become the first lower sheet of a subsequent pack and which thus extends at the bottom, at least in part beyond the lower edge of the clamp, by virtue of detachment means which act directly under the clamp on said precariously and erroneously held sheet.

In accordance with an enhancement of said method, the collection bottom is provided with guiding and centering means for the sheets which vertically extend from the upper side of the bottom itself towards the sheet stack. The length of the guiding and centering means is such as to engage, in the raised position of the collection bottom against the stack, at least one lower sheet, preferably a number of lower sheets, of the sheet stack. Thus, upon the first detachment lowering of the collection bottom, said guiding and centering means are still engaged at least in the last lower sheet of the stack, while detachment is followed by a second lowering of the collection bottom for disengagement of the guiding and centering means for the overlying sheet stack.

Since detachment is accomplished extremely rapidly, the method in accordance with the invention provides for the accomplishment of said action, regardless of whether said phenomenon of precarious holding or adhesion of the last sheet of the pack to the sheet stack occurred or not, thus obtaining the advantage of avoiding further means for controlling the continuation of said event.

Owing to the fast and simple detachment phase which requires non-costly detachment means of a simple design, the method and the device in accordance with the invention make it possible to obtain sheet packs proportioned in an extremely precise manner. This prevents any sheet erroneously and precariously held on the bottom of the stack from detaching itself in an uncontrolled manner, causing an interruption in the production cycle or a jamming and/or damaging of the machine's operating parts. The sheet guiding and centering means control the fall of the sheet attached to the overlying pack which will thus be precisely aligned on the remaining part of the pack.

The purpose of the invention also includes other features which further enhance the above method and device and which are described thereafter.

BRIEF DESCRIPTION OF THE DRAWINGS

The specific features of the invention and its advantages will be more detailed in a description of the preferred implementation form, shown in a non-limitative way in the enclosed drawings, in which:

FIG. 4 is a partial top view of the means for removing the proportioned pack from the collection bottom.

FIGS. 5 to 16, schematic side views, show the various operating phases or steps for the formation of the sheet pack based on the method of the invention.

DESCRIPTION OF THE PREFERRED EMBODIMENTS

Figure 1:
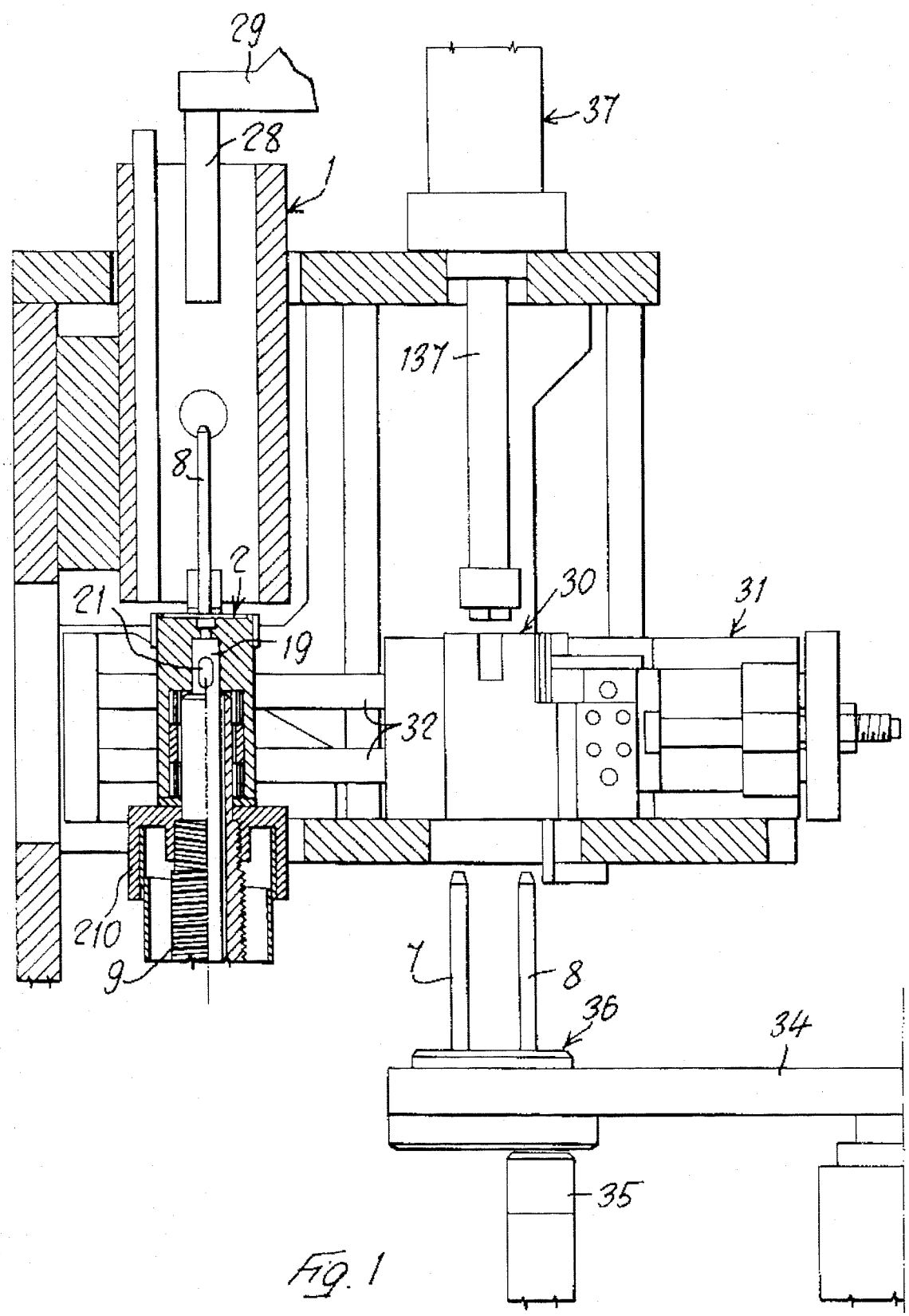
FIG. 1 is a side, partly cross-sectional, view of a device in accordance with the invention.

FIGS. 1 to 4 show a device for forming proportioned packs of trimmed metal sheets, for the manufacture of armatures of electrical machinery or the like. Said device includes a vertical magazine 1 for a sheet stack P (FIGS. 5 to 16). Magazine 1 is tubular and is correspondingly open at its lower end. There is associated therewith a coaxial collection bottom 2 which is supported in a raisable and lowerable manner with respect to magazine 1 itself.

The lower end of magazine 1 is provided with a clamp for a part of the lower sheets of stack P which is comprised of a fixed jaw 3, on a side of magazine 1, and which active clamping surface extends essentially aligned with the internal surface of magazine 1. The very opposite side of magazine 1 is provided with a mobile jaw 4 which can be radially moved in both directions with respect to the axis of magazine 1. The mobile jaw 4 is actuated by an actuator 5 which can be of any type, for instance, hydraulic, pneumatic or mechanical, and which is connected to the jaw by a suitable transmission 105 (not shown in detail). The radial position of both jaws 3 and 4 can be adjusted with respect to magazine 1, as the jaws are respectively mounted on a radial sliding guide or on a radially moving slide. Jaws 3, 4 of the clamp act together with one or more lower sheets of stack P, clamping between them the peripheral edges of the sheets on diametrically opposed sides, so as to prevent gravity descent of stack P in magazine 1. Advantageously, mobile jaw 4 has an active surface 104 which extends towards the bottom and is vertically tilted, in the direction of magazine 1 itself, towards the bottom, ending with its lower end flush with lower sheet L' of stack P.

At a higher level, to magazine 1 is attached a vice 6 which is provided with a radially sliding presser 106 and which clamps a part of stack P sheets against the opposite internal side of magazine 1. Vice 6 can be actuated like mobile jaw 4 of the clamp by an actuator 206 and allows a reduction of the weight of the overlying stack of sheets on the lower sheets of stack P acting together with the clamp.

The collection bottom 2 has two sheet guiding and centering vertical pins 7 and 8. Pins 7 and 8 protrude from the upper side of the collection bottom 2 and, in the position for raising said bottom 2 for collection of sheet pack P, said pins 7, 8 penetrate, to a certain extent inside stack P, engaging the internal profile of the sheets.

Obviously, the sheet guiding and centering means can also be accomplished otherwise in accordance with the specific profile of the sheets.

Figure 2:
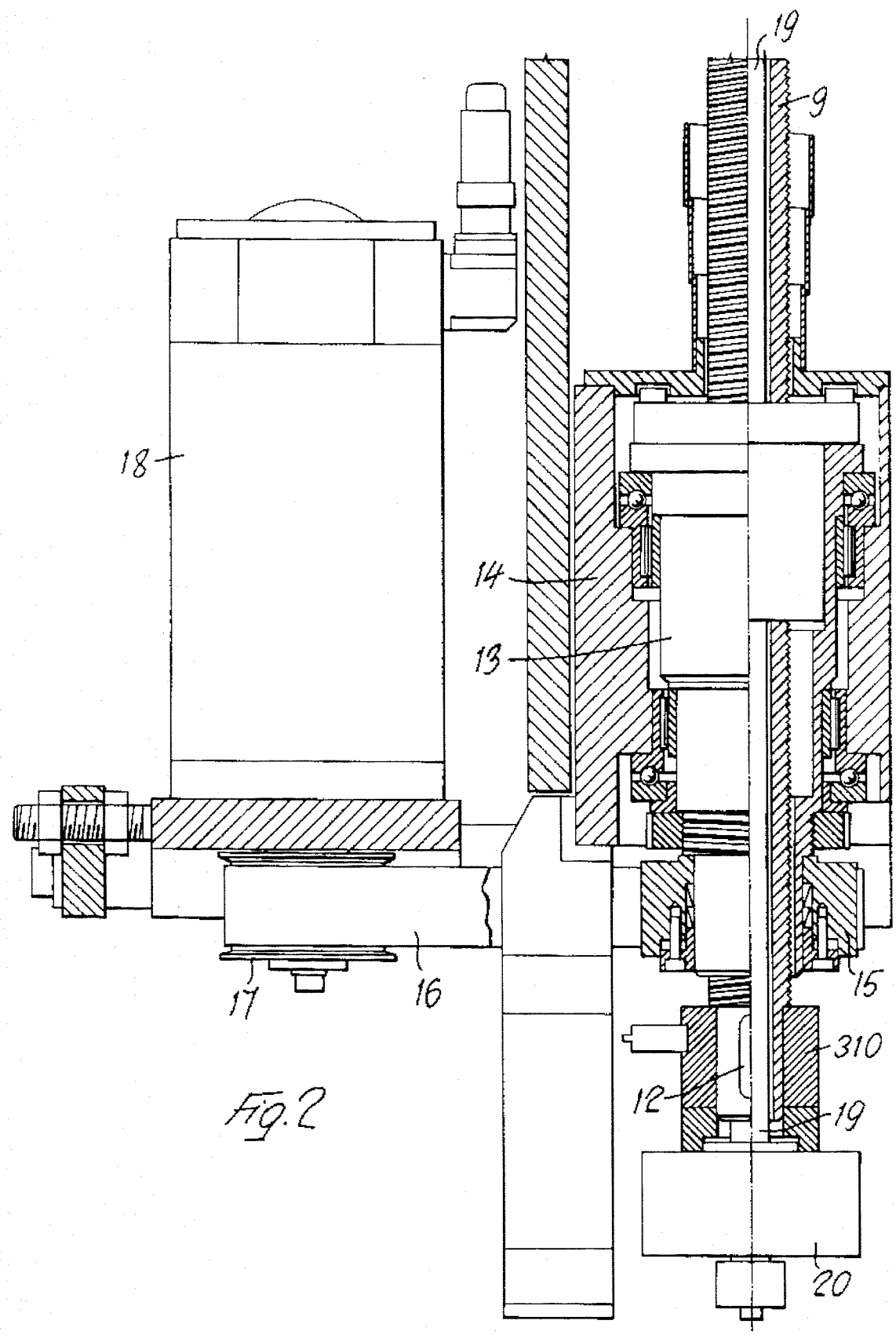
FIG. 2 is a side, partly cross-sectional, view of the actuating means, and the raising and lowering devices for the collection bottom.
Figure 3:
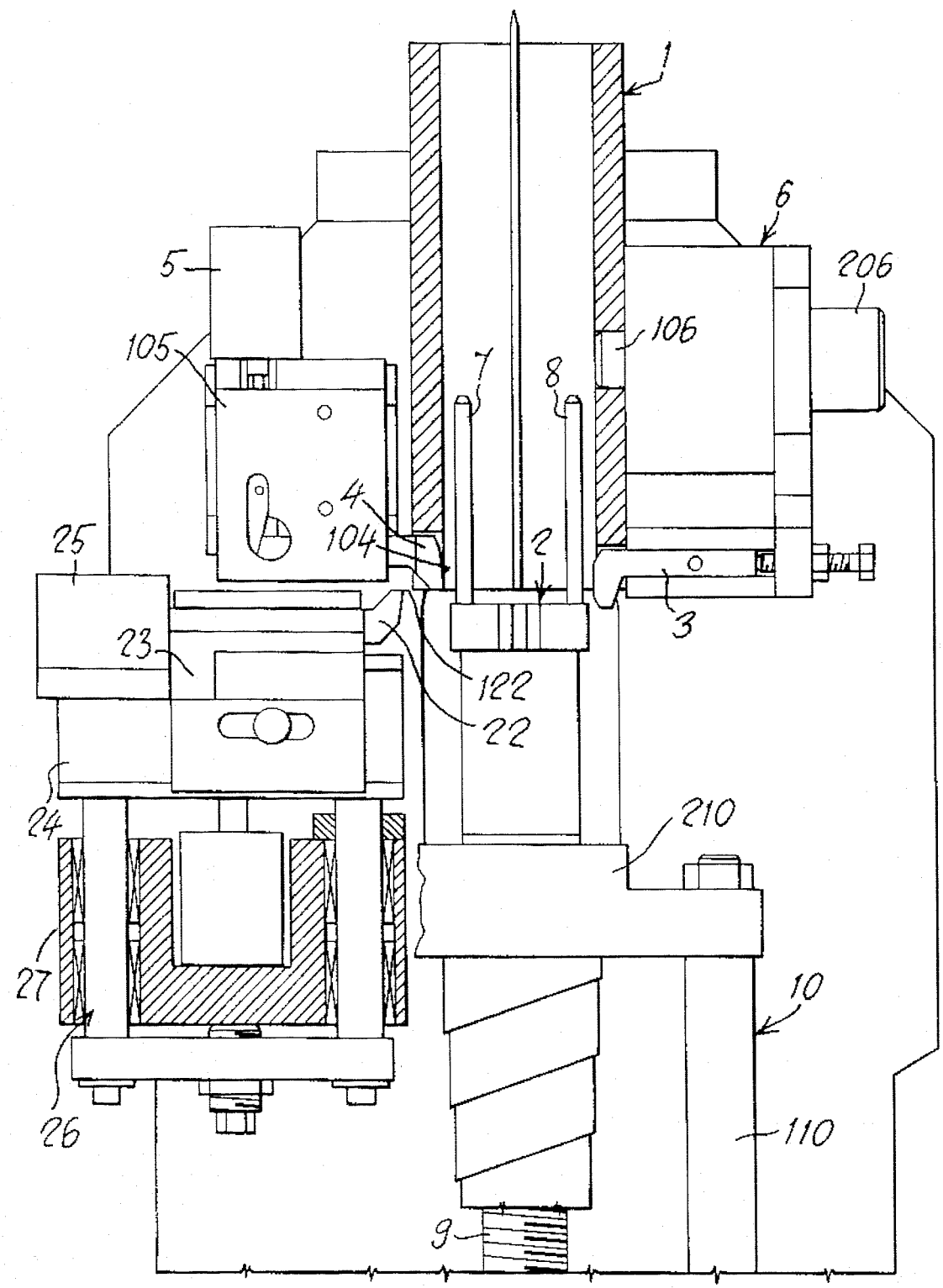
FIG. 3 is an enlarged partial side view of the device in accordance with the previous figures, related to the magazine area for the sheet stack.

As shown by FIGS. 1 to 3, the collection bottom 2 is comprised of the upper head of a cup element which is supported in a rotating manner with respect to it on the upper end of a threaded shaft 9. The threaded shaft 9 is supported in an axially sliding way by a slide 10 which is comprised of two guiding rods 110 parallel between them and with respect to shaft 9. The guiding rods 110 are engaged in non-illustrated tubular guides and are placed on diametrically opposed sides of shaft 9. They are connected between them on their traverse ends 210, 310 which are provided with a central hole which engages threaded shaft 9 and at least one of them 310 holds shaft 9 in a non-rotating way by means of radial keys 12.

Sliding of threaded shaft 9 occurs through a threaded sleeve 13, or similar, which is supported in a non-axially sliding way but rotating in a cylindrical body 14. The threaded sleeve 13 is rotating integrally with an actuating pulley 15 which is dynamically connected through a driving belt 16 to a pulley 17 keyed on the shaft of a motor 18. The motor 18 is preferably comprised of a step motor to which is attached a control gearcase (not shown) by which one can control very precisely the extent of the raising and lowering of the collection bottom 2 from counting the steps of motor 18 and thus the distance of bottom 2 from the last lower sheet L' which is held in magazine 1 for separation of pack P'.

The threaded shaft 9 is tubular and it houses inside itself, in a rotating way with respect to itself and axially sliding together, a shaft 19 which serves to rotate the collection bottom 2. The rotating shaft 19 protrudes beyond the lower end of threaded shaft 9 and beyond traverse 310 which connects guiding rods 110 of support slide 10, dynamically connecting through its lower end to an actuating and rotating motor 20 which is supported by the same traverse 310. The upper end of rotating shaft 19 protrudes too beyond the end of threaded shaft 9 and beyond corresponding traverse 210 and is engaged by rotation to the cup element comprising the bottom collection 2 by means of a radial key 21. The collection bottom 2 can thus be raised or lowered to a predefined extent with respect to magazine 1, and which collection bottom 2 also is rotated on itself coaxially with magazine 1 and sheet stack P.

Directly beneath mobile jaw 4 of the clamp there is a detachment finger 22 which can be raised and lowered with respect to the horizontal plane containing the lower edge of active surface 104 of jaw 4 of the clamp and the lower side of lower sheet L' of stack P and which can be further moved in both directions in the radial direction of magazine 1.

The detachment finger 22 is supported on a first radially sliding slide 23 which is engaged on a radial guide 24 and actuated by an actuator 25, pneumatic or other type. Radial guide 24 is supported by a vertically sliding slide generally indicated by 26 and actuated by a separate actuator 27 similar to the one used for slide 23. The detachment finger 22 has a detachment tooth 122 which protrudes both upwards and towards magazine 1. For the accomplishment of the detachment, said corner 122 is brought in readiness position right under the protruding lower edge of active surface 104 of jaw 4 and slightly moved backward with respect to said lower edge. During the actual detachment, the detachment finger 22 is radially moved in position of vertical alignment with the lower edge of active surface 104 of jaw 4 and subsequently in the axial direction of magazine 1, downwards.

To magazine 1 are attached axial compression means for sheet stack P, the only one shown being presser element 28 which can be axially inserted into magazine 1 and is supported by an arm 29 sliding on a vertical guide and controlled by any actuator (none shown). On the side diametrically opposed to detachment finger 22, the device provides a unit for collecting the sheet pack from collection bottom 2. This unit includes a transfer clip 30 which is placed at the level of collection bottom 2 in its position of second lowering, in which second lower position guiding and centering pins 7 and 8 are solidly disengaged from the sheet stack P held in magazine 1. The transfer clip 30 is supported in a radially sliding way with respect to collection bottom 2 by a slide generally indicated by 31 which is mounted on radial guides 32. The transfer clip 30 grasps the sheet pack formed on collection bottom 2 and brings it to a transfer station where it is taken away by transport means. Said means are comprised, for example, of a rotating plate 34 which is placed under transfer clip 30 and can be raised or lowered with respect to it by actuating means 35. Said plate 34 has, distributed along its peripheral area, several magazines 36 which are similar to collection bottom 2 and are also provided with sheet guiding and centering vertical pins 7 and 8. At the transfer station, the sheet pack held by transfer clip 30 is brought in a position which coincides with said magazines 36 which are raised against the pack.

In accordance with a further enhancement, the transfer station is provided with a probe 37 for measuring the height of pack P' which includes a vertical palpating rod 137 which slides axially with respect to the sheet pack held in transfer clip 30 and to which are connected sensors/translators of the position of said palpating rod 137.

FIGS. 5 to 16 schematically show the phases for forming the sheet pack P' by means of the method and device in accordance with the invention.

In the first phase of FIGS. 5 and 6, sheet stack P is blocked in magazine 1 against a downwards gravity slide by clamping between jaws 3 and 4 (hereafter clamp 3, 4) and by overlying vice 6. Collection bottom 2 is moved (arrow S) from its resting position to a raising position (FIG. 6) where it is placed at a predefined distance H from lower sheet L' of stack P. Said distance is predefinable and adjustable through the actuator described above. The detachment finger 22 is in an inactive readiness position, radially backed off with respect to the lower edge of active surface 104 of mobile jaw 4. In this position, pins 7, 8 for guiding and centering collection bottom 2 are engaged with the associated profile parts of a predetermined number of lower sheets of stack P.

Subsequently (FIG. 7), clamp 3, 4 and vice 6 open, so that sheet stack P descends due to gravity against collection bottom 2, the lower sheets of stack P being guided during their descent by guiding and centering pins 7, 8, so as to remain precisely aligned with one another. Then, FIG. 8, both clamp 3, 4 and vice 106 are closed, blocking again the sheet stack in magazine 1.

Collection bottom 2, FIG. 9, then proceeds to a first detachment lowering of sheet pack P' from the overlying sheet stack P. The lowering is accomplished for a predetermined measure N, so that sheet pack P' is solidly detached from the overlying stack P, while guiding and centering pins 7 and 8 are still engaged with their upper ends in at least one and preferably a number of the lower sheets of stack P.

As shown by FIG. 10, because of the thickness tolerances of the plate from which the sheets are taken, the last sheet L belonging to detached pack P' can remain engaged, for a limited portion of its thickness, in clamp 3, 4, thus protruding at the bottom beyond the lower edge of active surface 104 of mobile jaw 4. In this case, the sheet pack P' formed on the collection bottom is missing one sheet; while the missing sheet L precariously held by clamp 3, 4 can fall suddenly during subsequent process phases, causing damage, jamming and interruption of the operating cycle. Alternatively, sheet L can remain only moderately stuck to the lower sheet L' of stack P which constitutes the lower sheet of the successive pack due to the presence of lubricant oil, oxides, annealing, and the like.

In subsequent phases, shown by FIGS. 11 to 14, the detachment finger 22 is activated. The detachment finger 22 is moved from its readiness position, radially towards the axis of sheet stack P in a position of alignment with the lower end of active clamping surface 104 of mobile jaw 4 and thus strikes the part of sheet L erroneously and precariously held on the lower side of stack P (FIGS. 11 and 12). Subsequently, said detachment finger 22 proceeds to a second vertical lowering, as shown in FIGS. 13 and 14, causing the detachment and fall on sheet pack P' of the last sheet L' erroneously held by clamp 3, 4.

This fall is guided similarly to what is described for pack P' by guiding and centering pins 7 and 8, and thus sheet L lies perfectly on top of the underlying sheets of pack P'.

As shown by FIGS. 15 and 16, the detachment finger 22 is again radially moved from sheet stack P, and brought back to its readiness position, as shown by FIG. 5. Collection bottom 2 accomplishes a second lowering, disengaging guiding and centering pins 7 and 8 from the sheet stack P which is blocked in magazine 1, while pack P' alone can be grasped by transfer clip 30.

In accordance with an enhancement of the method, in order to eliminate imprecisions in proportioning of pack P' caused by slight elastic deformations of the sheets from a perfectly flat shape, right before reclosure of clamp 3, 4 as shown by FIG. 8, it is preferable to accomplish a radial compression of sheet stack P against collection bottom 2, with compression means 28 and 29.

Compression means are brought back to inactive position after reclosure of clamp 3, 4 and vice 6.

In order to eliminate the disadvantages due to an inconsistent distribution of the sheets' thickness tolerances, which can lead, in the manufacture of rotors' armature, to an inconsistent weight distribution around the rotation axis, and to different heights of the armature in various points, the invention also provides for the armature to be formed by several packs of superimposed sheets which are rotated among themselves to a predefined extent essentially based on their configuration. In this case, after formation of a first sheet pack P', or after the second lowering of collection bottom 2, by which guiding and centering pins 7 and 8 are disengaged from the overlying stack P, said bottom 2 is rotated for a predetermined angular measure, 180° for example. In this position, the above described phases for formation of a further sheet pack on the first pack P' previously formed and still present on collection bottom 2 are repeated. Each armature can be formed by several packs of superimposed sheets which are angularly staggered among themselves, the number of which can be predetermined based on the dimensional precision required and imposed by the material's tolerances.

I claim:

1. A method for automatically forming packs of metal trimmed sheets, wherein the packs are composed of a predetermined number of trimmed sheets corresponding to a predetermined height of the trimmed sheets, the predetermined height of trimmed sheets being drawn from a stack of the trimmed sheets in a vertical magazine which magazine is open at the bottom thereof and which permits a gravity falling of the sheet stack therethrough, said method comprising the steps of:

holding the sheet stack in the magazine against a gravity falling therethrough by a clamp having clamping surfaces which act against peripheral edges of at least a lowermost sheet of the trimmed sheets in the sheet stack;

shifting a collection bottom which is designed to hold the sheet pack after the sheet pack is drawn from the magazine from a lower position to a raised position at which raised position the collection bottom is vertically spaced from the open bottom of the magazine by the predetermined height;

releasing the clamp so that the clamping surfaces no longer hold the lowermost sheet of the sheet stack and so that the sheet stack falls by gravity into engagement with the collection bottom;

engaging of the clamp, after the sheet stack has fallen, against a prospective lowermost sheet of a remainder of the sheet stack located at a position lowermost in the clamp but completely above a lowermost part of both of the clamping surfaces to prevent further falling of the remainder of the sheet stack in the magazine above the prospective lowermost sheet;

lowering of the collection bottom away from the magazine to detach at least most of the sheets located between the collection bottom and the prospective lowermost sheet from the remainder of the sheet stack in the magazine; and detaching from the prospective lowermost sheet any last sheet which has a portion at a level below the lowermost part of one of the clamping surfaces and hence which is erroneously held to the prospective lowermost sheet with a detachment means for acting on the portion of any last sheet below the lowermost part of the one clamping surface so that the last sheet falls onto the sheets located on the lowered collection bottom and the predetermined number of sheets needed to form the sheet pack is present on the collection bottom.

2. A method for automatically forming packs of metal trimmed sheets as claimed in claim 1 wherein the collection bottom includes a guide means vertically protruding from an upper side of the collection bottom for guiding and centering the sheets which are detached onto the collection bottom;

wherein said shifting step includes the step of engaging a number of lower sheets of the sheet stack with the guide means as the collection bottom is moved from the lower position to the upper position, wherein said releasing step includes the guiding of the sheet stack into engagement of the collection bottom with the guide means, and wherein said lowering step includes
(a) a first lowering of the collection bottom away from the magazine by a distance which leaves a portion of the guide means still engaged with the prospective lowermost sheet so that during the detaching step any last sheet detached from the prospective lowermost sheet is engaged by the guide means for guided falling onto the sheets on the lowered collection bottom, and
(b) a second lowering of the collection bottom away from the magazine after the detaching step to move the guide means out of engagement with the prospective lowermost sheet which then becomes the lowermost sheet of the remainder of the sheet stack in the magazine.

3. A method for automatically forming packs of metal trimmed sheets as claimed in claim 1 wherein said detaching step is performed without regard for an actual presence of any last sheet.

4. A method for automatically forming packs of metal trimmed sheets as claimed in claim 1 and further including the steps of:

after said releasing step and prior to said engaging step, applying an axial compression on said sheet stack against the collection bottom, and after said engaging step, releasing of the axial compression on said sheet stack.

5. A method for automatically forming packs of metal trimmed sheets as claimed in claim 1 wherein the collection bottom is rotatable so that a further sheet pack can be placed on top of an initial sheet pack after rotation of the collection bottom, and further including, after the detaching step, the steps of:

rotating the collection bottom with the initial sheet pack thereon about a central axis of the magazine;

shifting the collection bottom with the initial sheet pack thereon to a raised position at which raised position a topmost sheet of the initial sheet pack is vertically spaced from the prospective lowermost sheet located in the bottom of the magazine by the predetermined height;

releasing the clamp so that the clamping surfaces no longer hold the prospective lowermost sheet of the remainder of the sheet stack and so that the remainder of sheet stack falls by gravity into engagement with the topmost sheet of the initial sheet pack;

engaging of the clamp, after the remainder of the sheet stack has fallen, against a further prospective lowermost sheet of a further remainder of the sheet stack located at a position lowermost in the clamp but completely above the clamping surfaces to prevent further falling of the further remainder of the sheet stack in the magazine above the further prospective lowermost sheet;

lowering of the collection bottom away from the magazine to detach at least most further sheets located between the topmost sheet and the further prospective lowermost sheet from the further remainder of the sheet stack in the magazine; and detaching from the further prospective lowermost sheet any further last sheet which has a portion at a level below one of the clamping surfaces and hence which is erroneously held to the further prospective lowermost sheet with a detachment means for acting on the portion of any further last sheet below the one clamping surface so that the further last sheet falls onto the further sheets located on the lowered collection bottom and the predetermined number of sheets needed to form a further rotated sheet pack on top of the initial sheet pack is present.

* * * * *